United States Patent [19]

Yamato

[11] Patent Number: 4,864,764
[45] Date of Patent: Sep. 12, 1989

[54] FISHING REEL FIXTURE

[75] Inventor: Yoshiro Yamato, Sakai, Japan

[73] Assignee: Shimano Industrial Company Limited, Osaka, Japan

[21] Appl. No.: 214,460

[22] Filed: Jul. 1, 1988

[30] Foreign Application Priority Data

May 21, 1988 [JP] Japan ............................ 63-67252[U]

[51] Int. Cl.$^4$ ...................... A01K 87/06; A01K 87/00
[52] U.S. Cl. ............................................. 43/22; 43/23
[58] Field of Search ........................................ 43/22, 23

[56] References Cited

U.S. PATENT DOCUMENTS

| | | |
|---|---|---|
| 2,512,082 | 6/1950 | Bainbridge ............................... 43/22 |
| 2,592,878 | 4/1952 | Esposito .................................. 43/22 |
| 2,885,816 | 5/1959 | Cunningham ............................ 43/22 |
| 4,133,133 | 1/1979 | Casset ..................................... 43/22 |
| 4,485,580 | 12/1984 | Ohmura ................................... 43/22 |
| 4,516,351 | 5/1985 | Highby .................................... 43/23 |
| 4,702,032 | 10/1987 | Ohmura ................................... 43/22 |
| 4,726,139 | 2/1988 | Tokuda ................................... 43/22 |
| 4,756,114 | 7/1988 | Ohmura ................................... 43/22 |

FOREIGN PATENT DOCUMENTS 51-54556 12/1976 Japan .

Primary Examiner—Kurt Rowan
Attorney, Agent, or Firm—Stevens, Davis, Miller & Mosher

[57] ABSTRACT

A reel fixture is provided which includes a base cylinder, a fixed holder fixed to the base cylinder, a movable pusher movably supported to the base cylinder, and an annular ring. The base cylinder is formed of a material including a prepreg of carbon fiber impregnated with synthetic resin and a thin scrim sheet of high strength fiber impregnated with synthetic resin. The prepreg is lined at its rear surface with the scrim sheet. The material forming the base cylinder is cylindrically wound a plurality of times such that the carbon fiber is circumferentially oriented. The base cylinder is provided at the outer periphery of one of its axial ends with a screw thread screwable with a threaded ring.

3 Claims, 1 Drawing Sheet

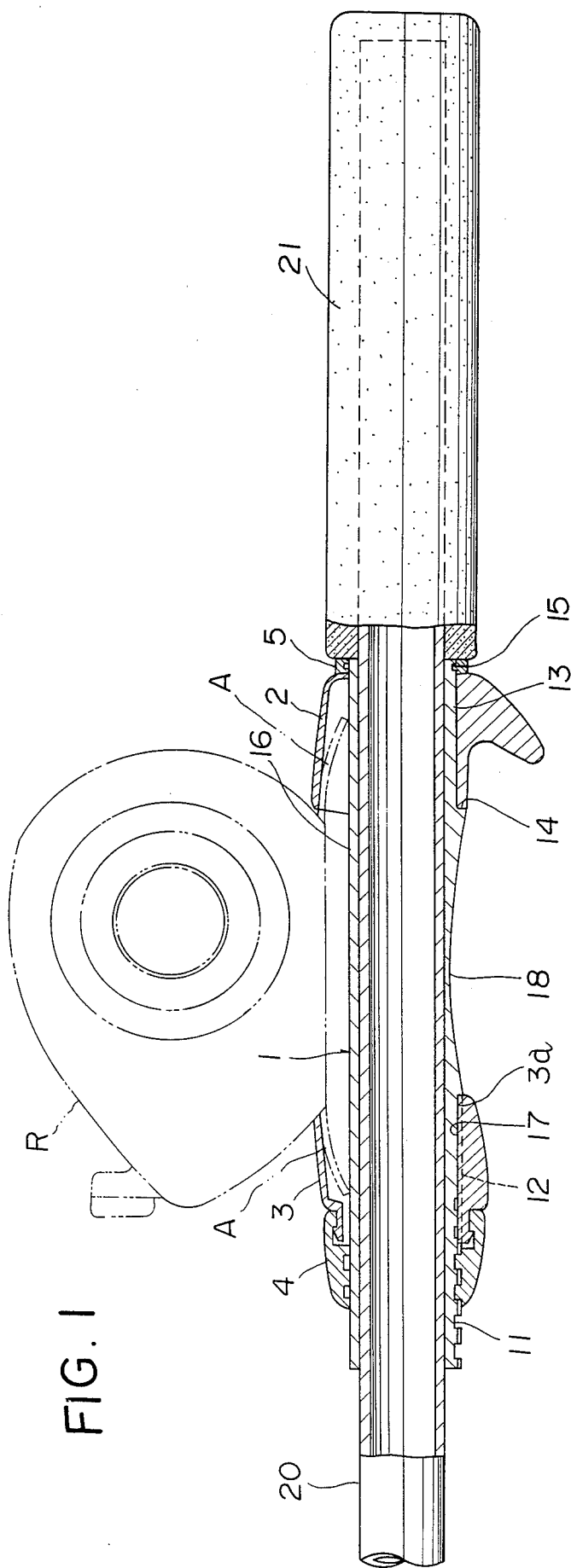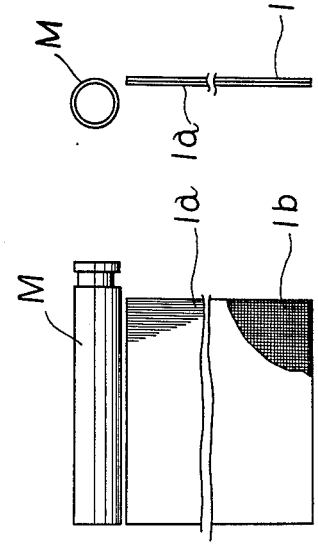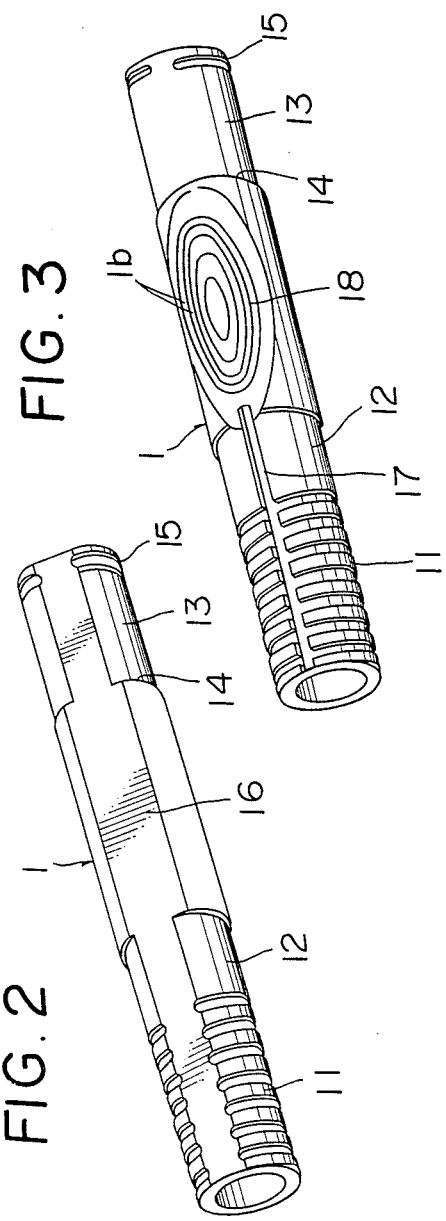

FISHING REEL FIXTURE

FIELD OF THE INVENTION

The present invention relates to a fishing reel fixture for mounting a fishing reel to a fishing rod.

BACKGROUND OF THE INVENTION

Conventionally, a fishing reel having a mounting leg is mounted on a fishing rod by use of a fishing reel fixture comprising a base cylinder fitted onto the fishing rod, a fixed holder fixed to one lengthwise end of the rod, a movable pusher movably supported to the base cylinder, and a threaded ring screwable therewith, with the base cylinder being fixed to the fishing rod, the mounting leg of the reel being positioned between the fixed holder and the movable pusher, and the threaded ring being screwably tightened to the base cylinder, thereby mounting the fishing reel to the fishing rod.

The base cylinder, as disclosed in, for example, Japanese Utility Model Publication Gazette No. Sho 51-54556, is formed of synthetic resin or a metallic pipe.

In addition, a base cylinder injection-molded with synthetic resin mixed with, for example, glass fiber chips has been proposed.

The base cylinder having a inner diameter coincident with an outer diameter of the base cylinder mounting portion of the fishing rod is previously formed separately from the fishing rod and fitted thereon and fixed with an adhesive. Particularly, when a fish is hooked such that a large bending load is applied to the fishing rod, the base cylinder formed of synthetic resin or a composite material is subjected to a large bending load, i.e., a collapsing pressure, thereby creating problems in that the base cylinder is easily broken and also in that the screw thread thereby has low strength so as to be easily broken.

SUMMARY OF THE INVENTION

An object of the present invention is to provide a fishing reel fixture which has an improved base cylinder structure and is lightweight as a whole, whereby the fishing rod, when subjected to a large bending load, can be prevented from being broken, and the threaded portion can have increased strength.

The fishing reel fixture of the invention is provided with a base cylinder fitted onto the fishing rod, a fixed holder fixed to one lengthwise side of the base cylinder, a movable pusher movably supported to the other lengthwise side of the same, and a threaded ring movably operating the movable pusher with respect to the fixed holder. The base cylinder is formed of prepreg of carbon fiber impregnated with synthetic resin and a thin scrim sheet of high strength fiber impregnated with synthetic resin. The prepreg is lined with the scrim sheet, with the carbon fiber being wound cylindrically a plurality of times in a circumferentially oriented manner. The base cylinder is provided at the outer periphery of a side supporting the movable pusher with a screw thread screwable with the threaded ring.

Thus, the base cylinder, which is formed by winding the prepreg of carbon fiber cylindrically, can be lightweight, and the prepreg, having carbon fiber circumferentially oriented, can be prevented from being broken even when the fishing rod is subjected to a large bending load. Also, the fiber is circumferentially oriented, so that, even when the base cylinder body is cut at its outer periphery, the threaded portion can have increased strength.

The above further objects and novel features of the invention will be more fully apparent from the following detailed description when the same is read in connection with the accompanying drawings.

BRIEF DESCRIPTION OF THE DRAWINGS

FIG. 1 is a sectional view of an embodiment of a fishing reel fixture according to the invention;

FIG. 2 is a perspective front view thereof;

FIG. 3 is a perspective rear view of the same; and

FIGS. 4 and 5 are illustrations of a manufacturing method of the same.

DETAILED DESCRIPTION OF THE PREFERRED EMBODIMENT

A fishing reel fixture shown in FIG. 1 is mounted in front of a grip 21 at the root end of a fishing rod 20 and provided with a base cylinder 1 fitted onto fishing rod 20, a fixed holder 2 fixed to one lengthwise side (at the right-hand side in FIG. 1) of base cylinder 1, a movable pusher 3 movably supported to the other lengthwise side (at the left-hand side in FIG. 1), and a threaded ring 4 for operating movable pusher 3 to move toward or away from fixed holder 2.

Base cylinder 1, as shown in FIG. 4, is formed of a material of prepreg 1a of parallel carbon fiber sheet into which synthetic resin is impregnated and a thin scrim sheet 1b of a woven sheet of glass fiber into which synthetic resin is impregnated. Prepreg 1a is lined with the scrim sheet and wound a plurality of times on a mandrel M in a circumferentially oriented manner so as to occupy a cylindrical shape, and a screw thread 11 screwable with threaded ring 4 is provided at the outer periphery of base cylinder 1 at a side of supporting movable pusher 3.

Base cylinder 1, which uses carbon fiber as the prepreg 1a, is lightweight and has very high rigidity. Moreover, prepreg 1a lined with scrim sheet 1b is wound so that its fiber is oriented circumferentially, thereby obtaining a high bending resistance strength and collapse-proof strength. Accordingly, in a case where the fishing rod is subjected to a large bending load so as to bend greatly, even when base cylinder 1 is subjected to a bending load and a collapsing load, base cylinder 1 can be prevented from being broken thereby.

Since the carbon fiber of prepreg 1a is circumferentially oriented, screw thread 11, even when formed spirally circumferentially, can have its strength raised to an extreme extent thereby preventing the screw thread from being broken.

Also, base material 1 is formed such that the material is wound around mandrel M and a cellophane tape is tightly wound on material 1 and then the material is baked in a heating furnace. Hence, base material 1 molded in this manner is extremely lightweight and has high strength against bending and collapsing.

After the cellophane tape and molding mandrel are removed, base cylinder 1 is cut at the outer periphery of one axial end thereof, thereby forming screw thread 11 and a support 12 for movable pusher 3. Base cylinder 1 is cut at its other axial end and provided thereat with a holding portion 13 for fixed holder 2, a stopper shoulder 14 for restraining fixed holder 2 from moving toward movable pusher 3, and a screw thread 15 screwable with a fixing nut 5 for fixing fixed holder 2. Also, one side surface of base cylinder 1 is cut lengthwise as shown in FIG. 2 to form a flat reel-receiving surface 16. The opposite side surface of base cylinder 1 at a side of supporting movable pusher 3 is grooved lengthwise as shown in FIG. 3 to thereby provide a locking groove 17 for locking rotation of pusher 3 and cut in a curved shape at an intermediate portion to thereby provide a thin finger contact recess 18.

Recess 18 is formed by accurately cutting prepreg 1a together with scrim sheet 1b from the exterior, whereby scrim sheet 1a appears on the surface as annular rings as shown in FIG. 3. Although the carbon fiber of prepreg 1a has a high light reflection property so as to reflect light well, the glass fiber of scrim sheet 1b is a relatively weak light reflector so as not to largely reflect the light. Hence, at finger contact recess 18, a relatively clear annular ring pattern appears as shown in FIG. 3, thereby yielding a good appearance. Also, an angler can sensitively feel a bite of a fish through thin finger contact recess 18, thereby facilitating fishing.

Stopper shoulder 14 is provided to reliably prevent movement of fixed holder 2 and to fit it at a predetermined position. Also, at the surface of base cylinder 1 is provided a flat reel receiving portion 16, thereby stably supporting a leg A of fishing reel R.

In addition, fixing holder 2 is fitted onto a holding portion 13 at base cylinder 1 and a nut 5 screws with screw thread 15, thereby holding fixed holder 2 between receiving shoulder 14 and nut 5. Onto one end of base cylinder 1 is fitted movable pusher 3 having a lock projection 3a engageable with locking groove 17 and threaded ring 4 is coupled with the rear end of movable pusher 3 to be rotatable relative thereto. Movable pusher 3 screws with screw thread 11. Then, base cylinder 1 is wound with prepreg, baked under pressure to be molded, then fitted onto the outer periphery of the fishing rod and bonded at its inner periphery with the rod by use of an adhesive.

Alternatively, in the above-described embodiment, scrim sheet 1b may be formed of a high strength fiber other than glass fiber.

As seen from the above, the present invention employs a material formed of carbon fiber impregnated with synthetic resin and lined with a scrim sheet of high strength fiber impregnated with synthetic resin, which is wound a plurality of times such that the carbon fiber is circumferentially oriented, thereby forming a cylindrical base cylinder 1, with base cylinder 1 being provided at the outer periphery of one ed with a screw thread 11 screwable with threaded ring 4. Hence, the fishing reel fixture of the invention is lightweight and, even when the fishing rod is subjected to a large bending load, can be prevented from being broken due to the bending and collapsing load. Furthermore, screw thread 11 has increased strength to be prevented from being broken.

While an embodiment of the invention has been shown and described, the invention is not limited to the specific construction thereof illustrated in the specification, since the shown embodiment is merely exemplary and the invention is only defined or limited by the attached claims.

What is claimed is:

1. A reel mounting fixture for mounting a fishing reel on a fishing rod, said fixture comprising:
    a base cylinder adapted to be fitted onto said fishing rod,
    a fixed holder to one lengthwise side of said base cylinder,
    a movable pusher movably supported to another lengthwise side of said base cylinder, and
    a threaded ring for causing said movable member to move toward and away from said fixed holder, said base cylinder being formed with prepreg material comprising prepreg of carbon fiber impregnated with synthetic resin and a thin scrim sheet of high strength fiber impregnated with synthetic resin, said prepreg being lined with said scrim sheet, said prepreg material being cylindrically wound a plurality of times such that said carbon fiber is circumferentially oriented, and said base cylinder being provided with a screw thread on an outer periphery thereof at a side supporting said movable pusher, said screw thread being screwable with said threaded ring.

2. A reel fixture according to claim 1, wherein said base cylinder comprises a recess provided between said fixed holder and said movable pusher, said recess being curved radially inwardly of said base cylinder.

3. A reel fixture according to claim 1, wherein said base cylinder comprises a stopper shoulder provided at one lengthwise side thereof for restraining said fixed holder from movement toward said movable pusher and a screw thread provided at said one lengthwise side at a position spaced apart from said stopper shoulder, said reel fixture further comprising a fixing nut screwable with said screw thread of said base cylinder, said fixed holder being fixed to said base cylinder in press-contact with said stopper shoulder.

* * * * *